United States Patent [19]

Duddy

[11] Patent Number: 4,506,317

[45] Date of Patent: Mar. 19, 1985

[54] MAGNETIC SUPPORT FOR FLASHLIGHT

[76] Inventor: James J. Duddy, 514 N. Metcalf St., Lima, Ohio 45801

[21] Appl. No.: 577,973

[22] Filed: Feb. 8, 1984

[51] Int. Cl.³ .............................................. F21V 21/00
[52] U.S. Cl. .................................... 362/396; 362/191; 362/398; 362/419; 362/426; 362/427
[58] Field of Search ............... 362/396, 398, 419, 427, 362/191, 426

[56] References Cited

U.S. PATENT DOCUMENTS

| 2,300,915 | 11/1942 | Florence | 362/396 X |
| 2,402,877 | 6/1946 | Dial | 362/396 X |
| 3,917,940 | 11/1975 | Duddy | 362/398 X |
| 4,220,304 | 9/1980 | Wong et al. | 362/191 X |

Primary Examiner—Stephen J. Lechert, Jr.
Attorney, Agent, or Firm—C. Hercus Just

[57] ABSTRACT

A service light for motor vehicle use and the like having a magnetic base attachable to an iron-containing object for support, a C-shaped resilient clamp support for a battery-type flashlight, an elongated arm pivotally connected at one end to the base, and a swivel unit connecting the other end of the arm to the resilient clamp support and including details by which the members of the unit are rotatably related and secured together swivelly.

2 Claims, 3 Drawing Figures

MAGNETIC SUPPORT FOR FLASHLIGHT

BACKGROUND OF THE INVENTION

One of the most perplexing and difficult problems to solve in working on automobiles and other types of motor vehicles is supporting light adequately upon the repair area. This problem is most acute especially after dark when it is necessary to repair a motor vehicle at a location remote from a garage such as along a highway. However, the problem is equally acute in poorly lighted garages. Also, even in relatively well-lighted garages, when working upon a portion of a motor vehicle somewhat obscured from light such as beneath a raised engine hood or beneath the chassis of a vehicle, suitable illumination frequently is inadequate. The principal purpose of the present invention is to supply the need for adequate light under the aforementioned circumstances, regardless of whether in a garage, along a roadside, or otherwise.

One of the types of lights most commonly used in garage work comprises a so-called "trouble" light comprising an electric bulb in a socket, shielded by a wire cage, and extending from an electric cord connected to an outlet socket. Common types of this arrangement include a wire hook connected to the protecting cage but there frequently is a problem as to where to hang the hook. In an effort to alleviate this problem, prior devices have resorted to the use of electric magnets and several relatively early examples of such devices comprise the subject matter of prior U.S. Pat. No. 1,405,221, to Jenkins, dated Jan. 31, 1922, in which a U-shaped horseshoe magnet is connected by a swivel unit to the wire shield of a naked electric bulb extending from a flexible cord, whereby the magnet may be attached to any iron-containing surface such as metallic members of a vehicle. A similar arrangement is the subject of another prior U.S. Pat. No. 1,561,554, to Little, dated Nov. 17, 1927, and in which the "trouble" light comprises a handle attached by a clip to an electro-magnet which is provided current from the flexible electric cord by which the bulb is illuminated.

Still another prior U.S. Pat. No. 1,932,143, to Piercy, dated Oct. 24, 1933, is similar to the Jenkins patent except that a simple pivot connection is included between the socket of the electric bulb and the horseshoe magnet, said magnet being illustrated as being attached to the fender of a vehicle. Departing from the light source being supplied from some type of current outlet such as in a garage or otherwise, prior U.S. Pat. No. 1,772,439, to Garbs, dated Aug. 5, 1930, employs the use of a battery-type flashlight which is engaged by a clamp attached to a suction cup for attachment of the clamp to a suitable supporting surface as long as the surface is relatively flat and smooth.

The inventor of the instant application also has had experience with utility electric lights or lamps and one example of a prior development of his comprises the subject matter of U.S. Pat. No. 3,917,940, dated Nov. 4, 1975, and comprises a magnetic base to which one end of an arm is pivotally connected and an electric socket which supports a conventional electric bulb is supplied current by a conventional flexible cord, the socket being connected to the opposite end of the arm by a swivel unit. This type of light is useful to be attached to an iron-containing surface such as the sheet metal of an automobile or the like or any other steel portion of the vehicle and the light is capable of being directed reasonably well upon a desired area as long as the light is convenient to an electric outlet socket to which the flexible cord may be attached. With this structure somewhat as an inspiration, the present applicant has adapted at least portions of his prior patent to a service light in the form of a battery-type flashlight and certain problems have been solved in such adaptation in order to provide maximum universal type positioning of the flashlight to shine upon the desired area while the light is supported magnetically upon a steel or iron-containing surface, details of which are set forth below.

SUMMARY OF THE INVENTION

It is the principal object of the present invention to employ preferably a flat, elastomeric magnet element which is magnetically attachable to a supporting surface of a vehicle or any other iron-containing surface and especially one which might be scratched if a conventional iron horseshoe magnet were employed, the magnet being pivotally connected to one end of an elongated arm and the opposite end of the arm is pivotally connected to a swivel unit to which a C-shaped metallic clamp member of elastic nature is arranged to receive the body portion of a body-type flashlight, whereby no additional sort of energy for the light is required as in the case of a conventional "trouble" light, such as commonly employed in garages.

Another object of the invention is to utilize a relatively refined construction by which the C-shaped elastic clamp member is connected by swivel means to one end of the aforementioned elongated arm so as to afford universal adjustment of the clamp member by means of axes were are transverse to each other and about which pivotal or swivelled movement is permitted.

A still further object of the invention ancillary to the foregoing object is to utilize in the swivelled structure a unit comprising first and second members, one of which is a yolk having legs embracing one end of the elongated arm and the other has a transverse groove in the outer end thereof to receive a shallow channel formed midway between the opposite jaws of the C-shaped clamp member, the channel being provided to accommodate the head of a headed pin which extends through the first and second members of the swivel unit without interference with the body of a flashlight when mounted in the clamp member.

Still another object of the invention is to provide the swivel unit with a recess in the member which has the transverse groove therein, said recess extending from said groove to contain a compression spring surrounding the connecting pin and the opposite end of said pin which projects between the legs of the yoke member of said swivel unit is engaged by locking means to secure the two members of the swivel unit together in a manner that the spring affords firm frictional engagement between the engaging surfaces of the two members.

Still another object of the invention ancillary to the foregoing object is to provide the pivotally engaging surfaces of the two members of the swivel unit with complementary circular and relatively rotatable recess and projection through which the connecting pins extend and thereby affording accurate positioning of the members of the swivel unit during relative rotation therebetween.

Details of the foregoing objects and of the invention, as well as other objects thereof, are set forth in the

DETAILED DESCRIPTION OF THE PREFERRED EMBODIMENTS OF THE INVENTION

Figure 3:
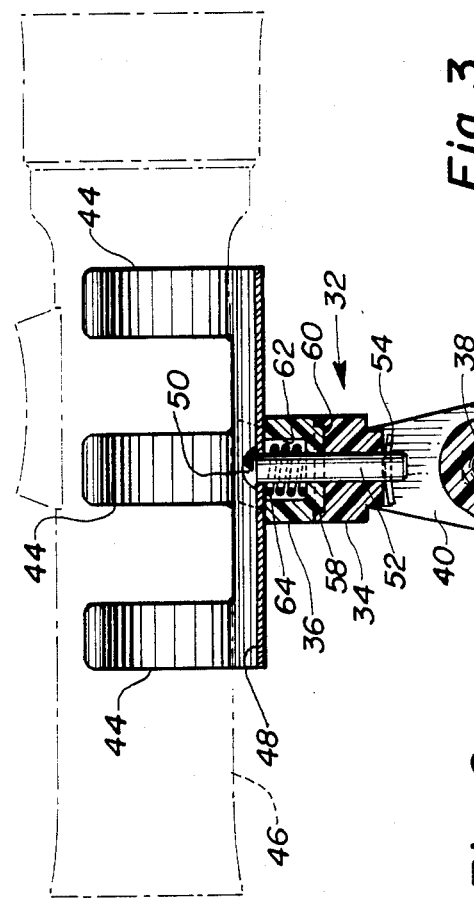
FIG. 3 is a plan view of a supplemental mounting plate.
Figure 2:
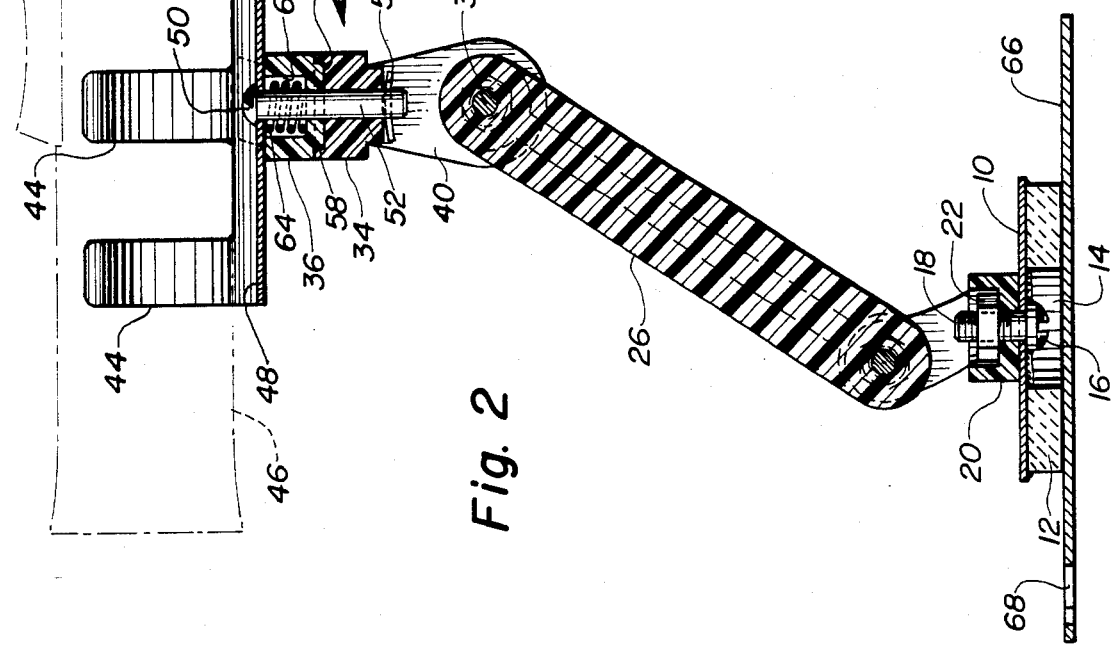
FIG. 2 is a vertical sectional view of the magnetic support shown in FIG. 1, taken on line 2—2 thereof, and also showing a flashlight body, in phantom, mounted thereon.
Figure 1:
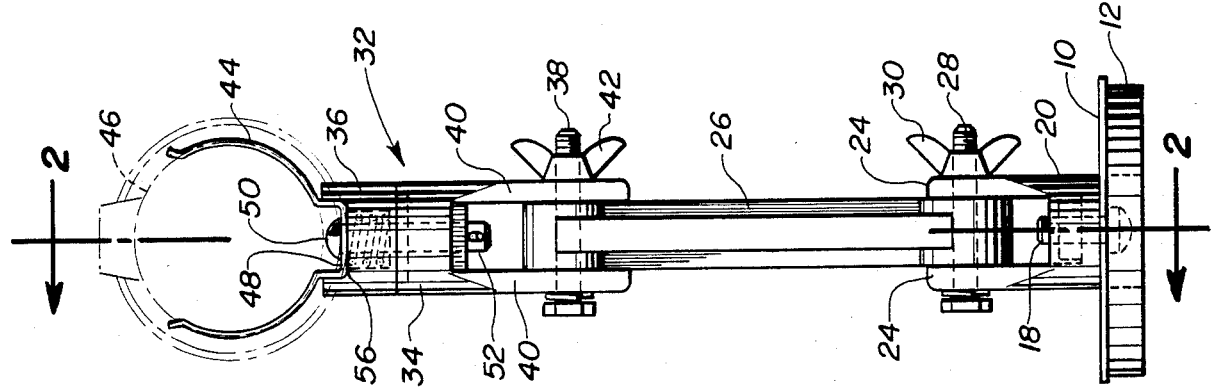
FIG. 1 is an end elevation of the magnetic support embodying the invention and showing, in phantom, a flashlight body mounted thereon.

Referring to the drawing, the supporting means included in the magnetically attachable light of the invention comprises a base plate 10 which may be metal and of any desirable geometric shape such as circular. An elastomeric magnet member 12 is secured such as by cement, or otherwise, to one surface of base plate 10. As seen in FIGS. 1 and 2, the magnet member 12 is of reasonable thickness and may be annular to provide a central opening 14 in which the head 16 of bolt 18 is received and extends through a suitable opening in base plate 10.

The selection of the elastomeric magnet member 12 has several objectives, one of these is to minimize the weight, as distinguished from that of a metallic magnet, and the second is to provide anti-scratching characteristics when applied against a shiny, smooth surface, and especially a painted surface such as that on the exterior of a motor vehicle or otherwise. The magnet is composed of a dispersion of permanently magnetized particles within an elastomeric medium such as a resin or rubber compound.

The bolt 18 secures to the upper surface of base plate 10 a substantially perpendicularly extending yoke member 20 which is molded or otherwise formed from rigid material and may be metal, although in the preferred embodiment of the invention, it is formed from rigid, strong plastic material and thereby provides electric insulating properties. The intermediate portion of the yoke 20 has a socket as shown in FIG. 2 to receive a nut 22 threaded on the upper end of bolt 18 to secure the yoke member 20 firmly to the base plate 10 and the legs 24 of yoke member 20 receive therebetween one end of an elongated arm 26 which may be formed of any suitable rigid material, or otherwise, but preferably of the material from which the yoke member 20 is formed. A pivot bolt 28 extends through the legs 24 and said one end of arm 26, the outer end of bolt 28 having a wingnut 30 threaded thereon.

Pivotally connected to the opposite end of arm 26 is a swivel unit 32, the members of which also are formed of rigid material and, in the preferred embodiment, said material is the same as or similar to that from which the yoke member 20 and arm 26 are formed.

The swivel unit 32 is composed of a first member 34 which also is a yoke, and a second member 36. First member 34 is connected to the upper end of arm 26 by a bolt 38 which extends through the legs 40 of yoke 34 and the wingnut 42 is threaded on the outer end of bolt 38 to clamp the swivel unit 32 in any desired position with respect to the upper end of arm 26.

Secured to the second member 36 of unit 32 is a C-shaped flexible metallic clamp unit preferably comprising a series of three clamping members 44 which are complementary to the body of a battery-type flashlight 46 which is shown in phantom in the figures. Such plurality of clamping members 44 provides ease of insertion of a flashlight body without sacrificing clamping ability. Midway between the arms of the clamp members 44 is a shallow channel 48 and a hole extends through said channel intermediately between the ends thereof to receive the head 50 of a pivot pin 52 which extends centrally through aligned openings in the first and second members 34 and 36 of the swivel unit 32, the end of the pin 52 which is opposite the headed end extends into the opening between the legs 40 of the yoke-like first member 34 for purposes of receiving locking means 54 which may be a simple cotter pin or a single straight member.

The second member 36 preferably is circular in cross section and the upper end thereof has a transverse groove 56 for purposes of receiving the channel 48 of the clamp member 44 as best shown in FIG. 1 and thereby accurately position the members for non-rotatable relationship such as when the clamp member 44 is to be moved rotatably about the pin 52 such as by grasping either the flashlight 46 or the clamp member 44 while the remaining elements of the structure are attached magnetically to a supporting surface by means of the magnet 12.

For purposes of maintaining the interengaging surfaces of the first and second members 34 and 36 in desired pivotal relationship about the pin 52, the engaging surfaces of said members are arranged with a circular projection 58 on member 36 which is complementary to and received within a recess 60 in the upper end of member 34. Such projection and recess readily are formed when molding the same within suitable dies.

In order to provide adequate adjustable, frictional engagement between the members 34 and 36, it will be seen especially from FIG. 2 that the second member 36 which has the transverse groove 56 therein also is provided with a circular recess 62 which extends downwardly from the groove 56 a predetermined distance adequate to receive compression spring 64, the opposite ends of which engage the outer surface of the shallow channel 58 and the inner surface of the circular recess 62 and thereby forces member 36 toward member 34 and separation of the same is prevented by the locking key 54 which extends through pin 52.

From the foregoing, it will be seen that the structure described above provides a highly refined, strong and durable supporting means for a battery-type flashlight which may be detachably connected magnetically to an iron-containing surface such as metal portions of motor vehicles, stoves, refrigerators, washing machines, or many other types of cast iron or steel, or sheet steel objects where it is desired to support a portable light preferably having its own source of energy such as the batteries of a flashlight and adapted for universal positioning of the light in such a manner that the illumination thereof may be directed and aimed at a desired locality and maintain the light in that position as long as the same is desired. Swivel or pivotal adjustment of the clamp member which supports the flashlight body readily is achieved and any desired position is maintained either by the use of the wingnuts 30 and 42 or the frictional coengagement between the members 34 and 30 of the swivel unit 32. Also, especially by forming the various supporting elements from non-metallic substances, such as appropriate rigid plastic material, electrical insulation is provided in the event the same is desired for safety purposes or otherwise.

Further to facilitate attaching the magnet 12 to a non-metallic surface, the invention contemplates use of a supplemental ferrous mounting disc or plate 66 which, for example, may have a hole 68 to permit hanging it upon a screw or nail, hook or otherwise on a wall surface for example. The magnet 10 will readily and strongly adhere magnetically to the mounting member 66 and thereby increase the possibilities of use of the service light of the invention.

The foregoing description illustrates preferred embodiments of the invention. However, concepts employed may, based upon such description, be employed in other embodiments without departing from the scope of the invention. Accordingly, the following claims are intended to protect the invention broadly, as well as in the specific forms shown herein.

I claim:

1. A magnetically attachable light adapted to be removably supported upon steel or iron-containing objects by firm magnetic connection and comprising in combination, a base plate of flat geometric configuration, flat elastomeric magnet means affixed to one surface of said plate, a yoke affixed to the opposite surface of said plate and extending substantially perpendicularly therefrom, an elongated arm pivotally attached at one end to said yoke, an elastic C-shaped metallic clamp member complementary to the body portion of a battery-type flashlight and comprising an elongated substantially shallow channel connected to and supporting three similar pairs of relatively narrow curved arms connected at one end respectively to opposite sides of said channel and respectively comprising individual C-shaped clamp members spaced longitudinally along said channel, and adapted to releasably engage said body portion at spaced intervals therealong and support said flashlight coaxially with said clamp member, and a swivel unit having a first member connected to said clamp member and a second member pivotally connected to the other end of said arm, whereby a flashlight when mounted in said clamp member is capable of universal positioning relative to a supporting object to which said magnet means is attached.

2. The light according to claim 1 further characterized by said elongated arm being formed of electrical insulating material, said first member of said swivel unit being circular and having a transverse groove in one end to receive said channel of said clamp member, a headed pin extending between said members of said swivel unit to swivelly connect the same, and the head of said pin being disposed in the channel of said clamp member without interference with a flashlight when supported by said member.

* * * * *